United States Patent
Maeda

(10) Patent No.: US 10,953,703 B2
(45) Date of Patent: Mar. 23, 2021

(54) MOTORCYCLE TIRE

(71) Applicant: Sumitomo Rubber Industries, Ltd., Kobe (JP)

(72) Inventor: Yohei Maeda, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 500 days.

(21) Appl. No.: 15/821,346

(22) Filed: Nov. 22, 2017

(65) Prior Publication Data

US 2018/0147897 A1    May 31, 2018

(30) Foreign Application Priority Data

Nov. 25, 2016    (JP) .............................. JP2016-229222

(51) Int. Cl.
     B60C 15/024      (2006.01)

(52) U.S. Cl.
     CPC ........ B60C 15/0242 (2013.01); B60C 15/024 (2013.01); *B60C 2200/10* (2013.01)

(58) Field of Classification Search
     CPC .............. B60C 15/0242; B60C 15/024; B60C 2200/10
     See application file for complete search history.

(56) References Cited

U.S. PATENT DOCUMENTS

| | | | |
|---|---|---|---|
| 4,434,831 A | 3/1984 | Uemura | |
| 2004/0187995 A1* | 9/2004 | Yoshinaka | B60C 3/04 152/454 |

FOREIGN PATENT DOCUMENTS

| | | | |
|---|---|---|---|
| DE | 3616199 A1 | 11/1987 | |
| EP | 2135752 A1 | 12/2009 | |
| FR | 1536469 A | 8/1968 | |
| JP | 58-4607 A | 1/1983 | |
| JP | H 10109507 | * 4/1998 | ............. B60C 13/00 |
| JP | 2006-36161-0 A | 2/2006 | |

OTHER PUBLICATIONS

English Translation of JPH 10109507 (Year: 1998).*
Extended European Search Report for Application No. 17202009.1, dated Mar. 8, 2018.

* cited by examiner

*Primary Examiner* — Alison L Hindenlang
*Assistant Examiner* — Olukorede Esan
(74) *Attorney, Agent, or Firm* — Birch, Stewart, Kolasch & Birch, LLP

(57) ABSTRACT

A motorcycle tire comprises bead portions each having an axially outer surface provided with a profile which comprises a radially inner portion and a radially outer portion. The radially inner portion is located axially outward of a bead core and extending substantially linearly in the tire radial direction. The radially outer portion is smoothly continued from the radially inner portion and extends radially outwardly to a sidewall portion, while inclining toward the axially outside. When an axial width between the bead portions is adjusted to coincide with a rim width between rim flanges, and an axial center of the axial width coincides with an axial center of the rim width, and further the tire rotational axis coincides with the rotational axis of the wheel rim, then at least a part of the radially outer portion of the profile protrudes axially outwardly from a profile of the inner surface of the rim flange.

10 Claims, 4 Drawing Sheets

MOTORCYCLE TIRE

TECHNICAL FIELD

The present invention relates to a motorcycle tire which is used by being mounted on a wheel rim comprising bead seats and rim flanges, more particularly to a profile for the axially outer surfaces of the bead portions capable of improving ride comfort and handling stability of the tire.

BACKGROUND ART

There have been known motorcycle tires whose bead portions are improved in the profile of the axially outer surface of the bead portion in order to improve various tire performances.

For example, the following Patent Document 1 discloses a motorcycle tire, wherein the axially outer surface of each bead portion is curved convexly toward the axially inside of the tire at a radial position corresponding to the highest point of the rim flange. Thereby, during vulcanization-molding the tire, air is hardly remained between the tire and the vulcanizing mold, which improves the quality of the vulcanized tire and productivity.

Patent Document 1: Japanese Patent Application Publication No. 2006-036161

SUMMARY OF THE INVENTION

In recent years, with the speeding up and increasing size of the motorcycles, among various performances required for a motorcycle tire, attention is focused on handling stability and riding comfort when a large load acts on the tire, for example, at the time of accelerating from the full bank state, traveling over a gap and the like.

In the motorcycle tire disclosed in the Patent Document 1, it is conceivable to improve the handling stability when a large load act on the tire by increasing the rigidity of the bead portions. However, by increasing the rigidity of the bead portions, the ride comfort when a small load acts on the tire is deteriorated. Therefore, the motorcycle tire has room for improvement in order to achieve both the ride comfort and the handling stability.

The present invention was made in view of the circumstances described above, and it is an object of the present invention to provide a motorcycle tire in which, by providing an improved profile for the axially outer surfaces of the bead portions, both the ride comfort and the handling stability can be achieved.

According to the present invention, a motorcycle tire which is used by being mounted on a standard rim comprising a pair of bead seats and a pair of rim flanges, comprises: a tread portion, a pair of sidewall portions, a pair of bead portions each with a bead core therein, and a carcass comprising a carcass ply having both edge portions turned up around the respective bead cores, wherein an axially outer surface of each of the bead portions has a profile which comprises
a radially inner portion located axially outward of the bead core and extending substantially linearly in the tire radial direction, and
a radially outer portion smoothly continued from the radially inner portion and extending radially outwardly, while inclining toward the axially outside, to be connected to the sidewall portion, and
in the following conditions: an axial width between the bead portions is adjusted to coincide with a rim width between the rim flanges, an axial center of the axial width between the bead portions coincides with an axial center of the rim width between the rim flanges, and the rotational axis of the tire coincides with the rotational axis of the wheel rim, at least a part of the radially outer portion of the profile protrudes axially outwardly from a profile of the inner surface of the rim flange so as to form an overlap region defined as being surrounded by the profile of the bead portion and the profile of the rim flange.

In the meridian cross-section of the tire, an overlapping amount of the overlap region defined by a distance measured from the profile of the rim flange to the profile of the bead portion normally to the rim profile, has a maximum which preferably occurs in a radially outer half of the overlap region when halved in the tire radial direction at the intermediate position of the radial height of the overlap region.

Preferably, the maximum of the above-said overlapping amount is from 0.5 is 3.0 mm.

In the meridian cross-section of the tire, the area of the above-said overlap region is preferably in a range from 3.5 to 20 sq·mm.

Preferably, the above-said radially outer portion comprises a linear part extending substantially linearly in the meridian cross-section of the tire.

Therefore, in the motorcycle tire according to the present invention, since the radially inner portion and the radially outer portion of the profile are smoothly connected with each other, there is no possibility that stress locally concentrates on the axially outer surface of the bead portion. Further, when the axial width between the radially inner portions is adjusted to coincide with the rim width between the rim flanges, since the radially inner portions match with the rim flanges, the tire mounting work becomes easy, and it is possible to improve the accuracy of the tire mounting.

Since the radially outer portion of the bead profile protrudes from the profile of the rim flange, it is possible to increase the rubber thickness to improve the rigidity of the bead portion, especially, radial rigidity, axial rigidity and torsional rigidity.

Further, when the tire is mounted on the rim, the protruding part is compressed by the rim flange, and as a result, the rigidity of the bead portion is further improved. Therefore, the motorcycle tire according to the present invention, can be improved in the handling stability when a large load is applied.

On the other hand, due to the presence of the protruding part, the carcass is positioned slightly axially inward, and as a result, the tension of the carcass cords are decreased, and the rigidity of the bead portion, especially that in the radial direction is reduced. Therefore, the motorcycle tire according to the present invention is improved in the absorption when applied by a small load and the ride comfort can be improved. Further, even when the tension of the carcass cords is decreased, as the axial rigidity and the torsional rigidity are maintained, the handling stability of the tire can be maintained.

DESCRIPTION OF THE PREFERRED EMBODIMENTS

The present invention is suitably applied to a tire for a large-sized motorcycle for high-speed running.

Embodiments of the present invention will now be described with reference to the accompanying drawings.

Figure 1:
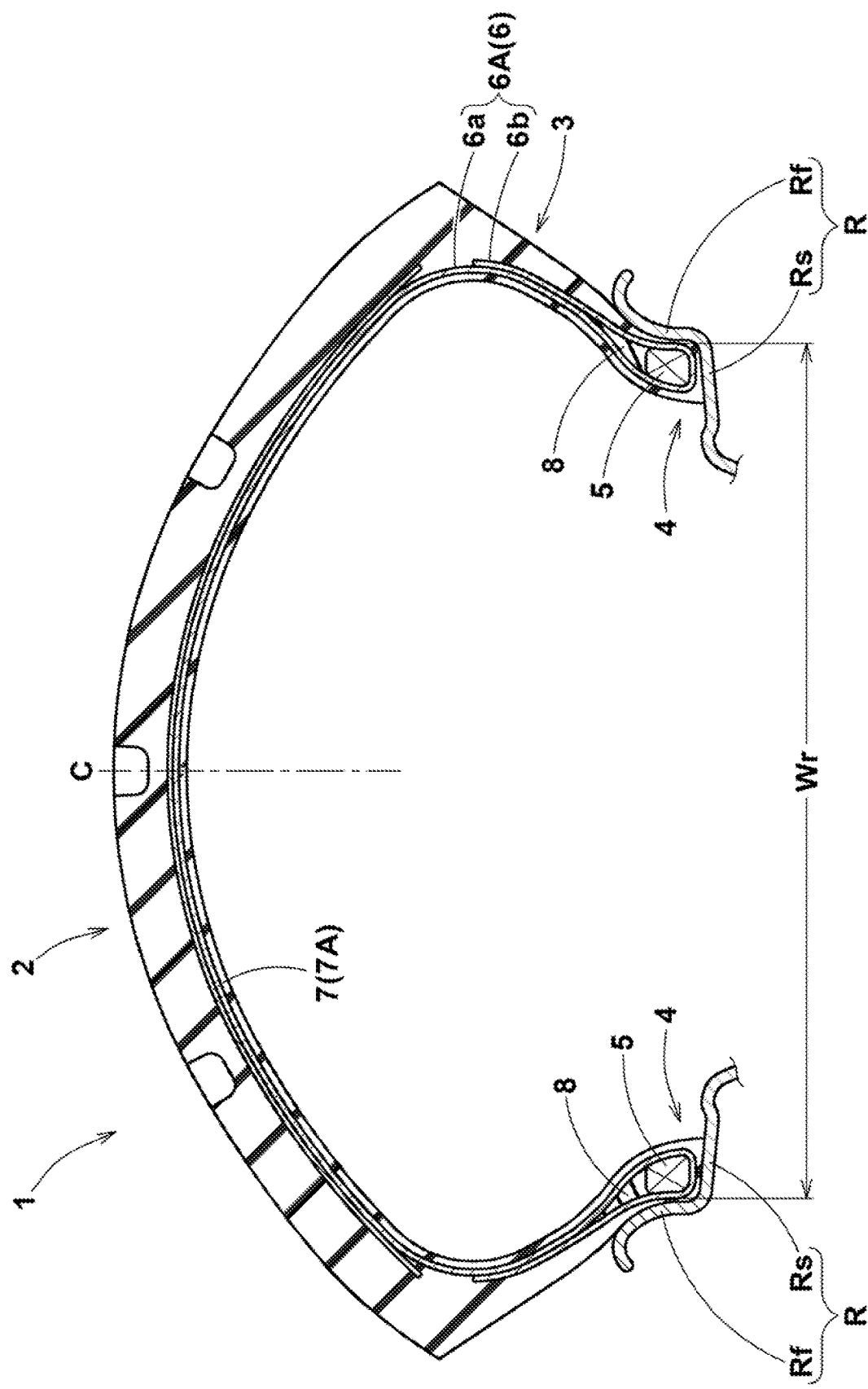
FIG. 1 is a meridian cross-sectional view of a motorcycle tire as an embodiment of the present invention.

In the following embodiments, each motorcycle tire 1 is a pneumatic tire used by being mounted on a standard wheel rim (R) comprising a pair of bead seats Rs and a pair of rim flanges Rf as shown in FIG. 1.

The standard wheel rim (R) has a rim width wr defined between the rim flanges Rf as shown in FIG. 1.

FIG. 1 shows a cross section of the motorcycle tire 1 under its normally inflated unloaded condition taken along a tire meridian plane including the tire rotational axis.

In this application including specification and claims, various dimensions, positions and the like of the tire refer to those under the normally inflated unloaded condition of the tire unless otherwise noted.

The normally inflated unloaded condition is such that the tire is mounted on a standard wheel rim (R) and inflate to a standard pressure but loaded with no tire load.

The standard wheel rim (R) is a wheel rim officially approved or recommended for the tire by standards organizations, for example, JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list, for example, the "maximum air pressure" in JATMA, the "Inflation Pressure" in ETRTO, the maximum pressure given in the "Tire Load Limits at various Cold Inflation Pressures" table in TRA or the like.

The motorcycle tire 1 has a tread portion 2 whose outer surface defines the tread, a pair of axially spaced bead portions 4 mounted on the bead seats Rs, a pair of sidewall portions 3 extending between the tread edges and the bead portions 4. Further, the motorcycle tire 1 is provided with a carcass 6 extending between the bead portions 4 through the tread portion 2 and the sidewall portions 3, a tread reinforcing band 7 disposed radially outside the carcass in the tread portion, and a bead core 5 embedded in each of the bead portions 4.

Each of the bead cores 5 is made of a non-stretchable material extending in the tire circumferential direction in order to retain the bead portions on the bead seats Rs.

The carcass 6 comprises at least one ply 6A of carcass cords arranged at an angle of from 75 to 90 degrees with respect to the tire equator C and extending between the bead portions 4 through the tread portion 2 and sidewall portions 3 and turned up around the bead core 5 in each bead portion, preferably from the axially inside to the axial outside of the tire, so as to have a pair of turned-up portions 6b and a main portion 6a therebetween.

For the carcass cords, organic fiber cords such as nylon, polyester, rayon and the like are preferably used.

Each of the bead portions 4 is provided between the carcass ply turnup portion 6b and main portion 6a with a bead apex rubber 8 made of hard rubber and extending radially outwardly from the bead core 5.

The band 7 includes at least one ply 7A of one or more band cords wound at an angle of less than 5 degrees with respect to the tire equator C.

For the band cords, organic fiber cords such as aramid and rayon and steel cords are preferably used.

Figure 2:
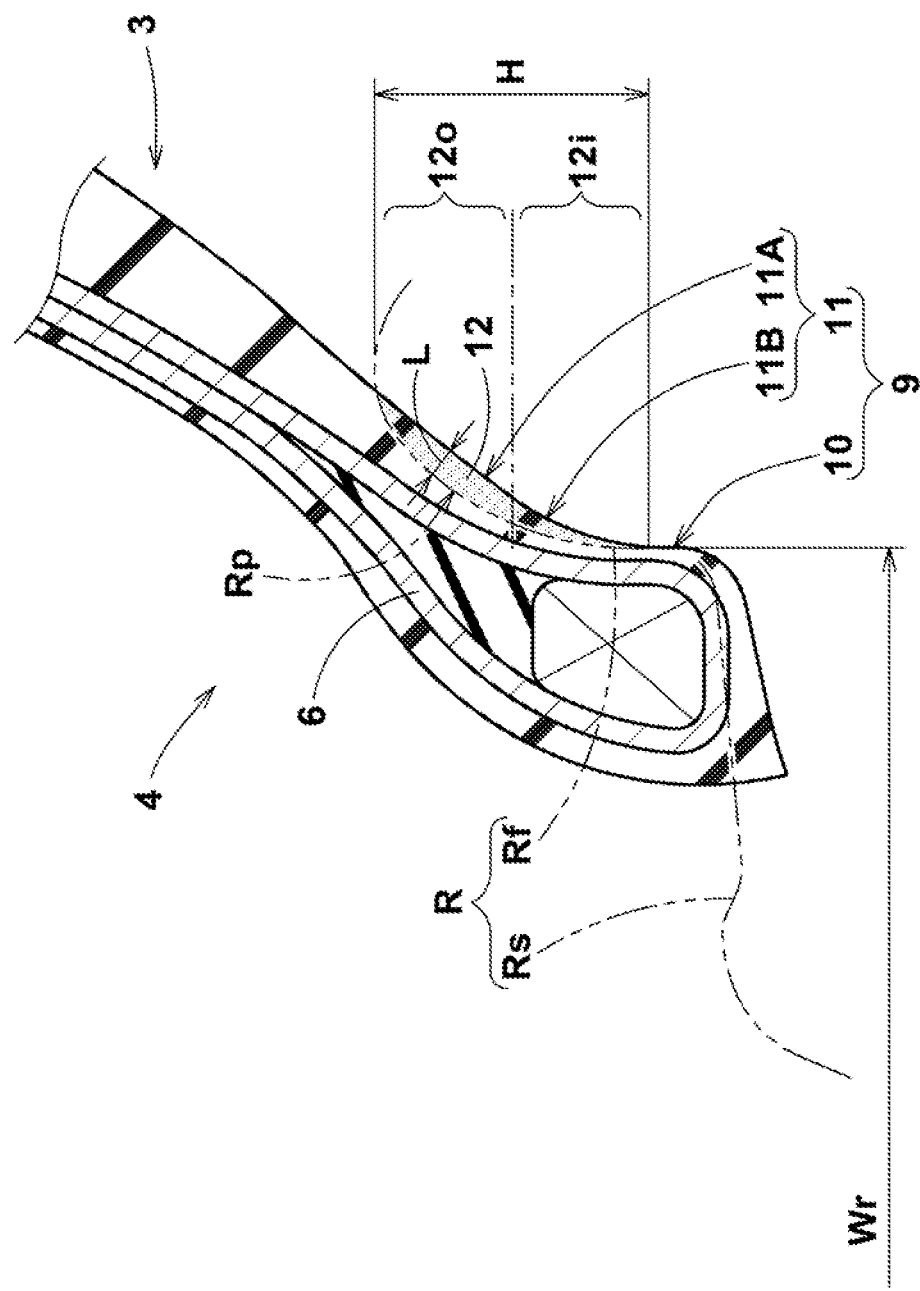
FIG. 2 is an enlarged cross-sectional view of the bead portion thereof.

FIG. 2 shows one of the bead portions 4 of the tire 1 as the first embodiment, wherein the bead portion 4 is in its free state not mounted on a rim, when the axial width between the bead portions 4 is adjusted to coincide with the rim width wr between the rim flanges Rf.

FIG. 2 also shows, by alternate long and two short dashes line, the profile of the standard wheel rim (R) from a bead seat hump to the rim flange Rs through the bead seat Rs when the rotational axis of the wheel rim coincides with the rotational axis of the tire, and the tire equatorial plane is aligned with the axial center of the rim width wr.

As shown in FIG. 2, the axially outer surface of each of the bead portions 4 is provided with a profile 9. The profile 9 comprises a radially inner portion 10 located axially outward of the bead core 5, and a radially outer portion 11 located radially outward of the radially inner portion 10.

The radially inner portion 10 extends substantially linearly in the tire radial direction and substantially along the rim flange Rf. As used herein, the term "substantially linear" means exactly linear as well as not exactly linear but regarded as linear when observed by the person skilled in the art.

The radially outer portion 11 is connected to the radially outer edge of the radially inner portion 10 smoothly, namely, without an inflection point.

Preferably, the radially outer portion 11 is extended radially outwardly to the sidewall portion 3, while inclining toward the axially outside.

The radially outer portion 11 in the first embodiment is composed of a linear part 11A extended radially inwardly from the sidewall portion 3, and an arcuate part 11B smoothly connecting between the linear part 11A and the radially inner portion 10.

It is preferable that the linear part 11A is substantially linear. It is preferable that the arcuate part 11B has a single radius of curvature.

As shown in FIG. 2 which shows the relationship between the tire bead profile and the wheel rim profile under the above-mentioned conditions, at least a part of the radially outer portion 11 of the profile 9 protrudes axially outwardly from the profile Rp of the axially inner surface of the rim flange Rf of the standard wheel rim (R).

The region surrounded by the radially outer portion 11 of the profile 9 and the profile Rp of the rim flange Rf is referred as the "overlap region 12" between the bead portion 4 and the rim flange Rf.

It is preferable that the area of the overlap region 12 is set in a range from 3.5 to 20 sq·mm.

It is preferable that the radial height H of the overlap region 12 is set in a range from 3 to 12 mm.

Such overlap region 12 makes the rigidity of the bead portion 4 appropriate, and it is possible to achieve both the ride comfort and handling stability of the tire 1.

The overlapping amount L of the overlap region 12, which is a distance measured from the profile Rp of the rim flange Rf to the profile 9 of the bead portion normally to the rim profile Rp, has a maximum, and it is preferable that the maximum occurs in a radially outer portion 12o.

Preferably, the maximum is in a range from 0.5 to 3.0 mm.

Here, the radially outer portion 12o is a radially outer half of the overlap region 12 when being halved in the tire radial direction at the intermediate position of the radial height H. In FIG. 2, "12i" denotes the radially inner portion.

If the maximum of the overlapping amount L is smaller than 0.5 mm, the effect of improving the rigidity of the bead portion 4 may become limited. If the maximum of the overlapping amount L is greater than 3.0 mm, there is a possibility that, when the bead portion is mounted on the rim, the compression of the overlap region and the tension of the carcass cords become to large. As a result, there is a possibility that the rigidity of the bead portion 4 become excessively high when a large load is applied, and become insufficient when a small load is applied thereto.

Figure 3:
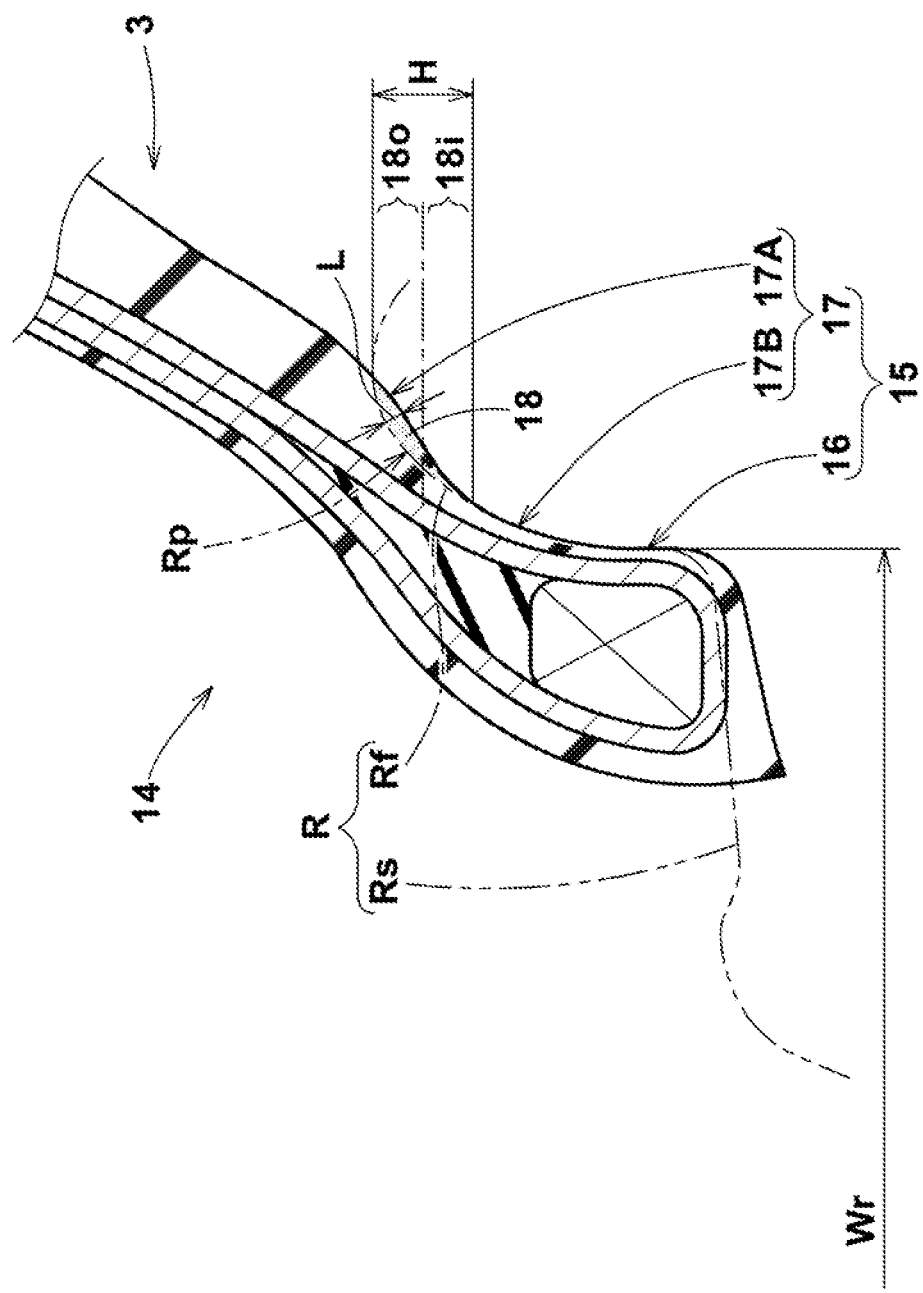
FIG. 3 is an enlarged cross-sectional view of the bead portion of another embodiment of the present invention.

FIG. 3 shows one of the bead portions 14 of a second embodiment of the present invention.

FIG. 3 also shows the profile of the standard wheel rim (R) by alternate long and two short dashes line under the conditions as described with respect to FIG. 2.

As shown in FIG. 3, the axially outer surface of each of the bead portions 14 is provided with a profile 15. The profile 15 comprises a radially inner portion 16 located axially outward of the bead core 5, and a radially outer portion 17 located radially outward of the radially inner portion 16.

Similarly to the radially inner portion 10 in the first embodiment described above, the radially inner portion 16 in the second embodiment extends substantially linearly in the tire radial direction and substantially along the rim flange Rf. Similarly to the radially outer portion 11 in the first embodiment described above, the radially outer portion 17 is connected to the radially outer edge of the radially inner portion 16 smoothly, namely, without an inflection point. Preferably, the radially outer portion 17 is extended radially outwardly to the sidewall portion 3, while inclining toward the axially outside.

Unlike the radially outer portion 11 in the first embodiment described above, the radially outer portion 17 in the second embodiment comprises arcuate parts 17A and 17B each extending in an arc shape.

The arcuate part 17A extends radially inwardly from the sidewall portion 3, while curving toward the axially inside.

The arcuate part 17B extend radially inwardly from the arcuate part 17A to the radially inner portion 16, while curving toward the axially outside, without an inflection point at their junctions. It is preferred that each of the arcuate parts 17A and 17B has a single radius of curvature.

Similarly to the first embodiment, at least a part of the radially outer portion 17 of the profile 15 protrudes axially outwardly from the profile Rp of the inner surface of the rim flange Rf of the standard wheel rim (R), therefore, there is formed an overlap region 18 surrounded by the radially outer portion 17 of the bead profile 15 and the rim profile Rp. Preferably, the area and radially height H of the overlap region 18 are set in the same ranges as those for the overlap region 12 in the above-described first embodiment.

The overlapping amount L of the overlap region 18, which is a distance measured from the profile Rp of the rim flange Rf to the profile 15 of the bead portion normally to the rim profile Rp, has a maximum, and it is preferable that the maximum occurs in a radially outer portion 18o.

Preferably, the maximum is in a range from 0.5 to 3.0 mm.

Here, the radially outer portion 18o is a radially outer half of the overlap region 18 when halved in the tire radial direction at the intermediate position of the radial height H. In FIG. 3, "18i" denotes the radially inner portion.

The bead portion 14 having such overlap region 18 can achieve both the ride comfort and handling stability of the tire 1 similarly to the bead portion 4 of the first embodiment described above.

Figure 4:
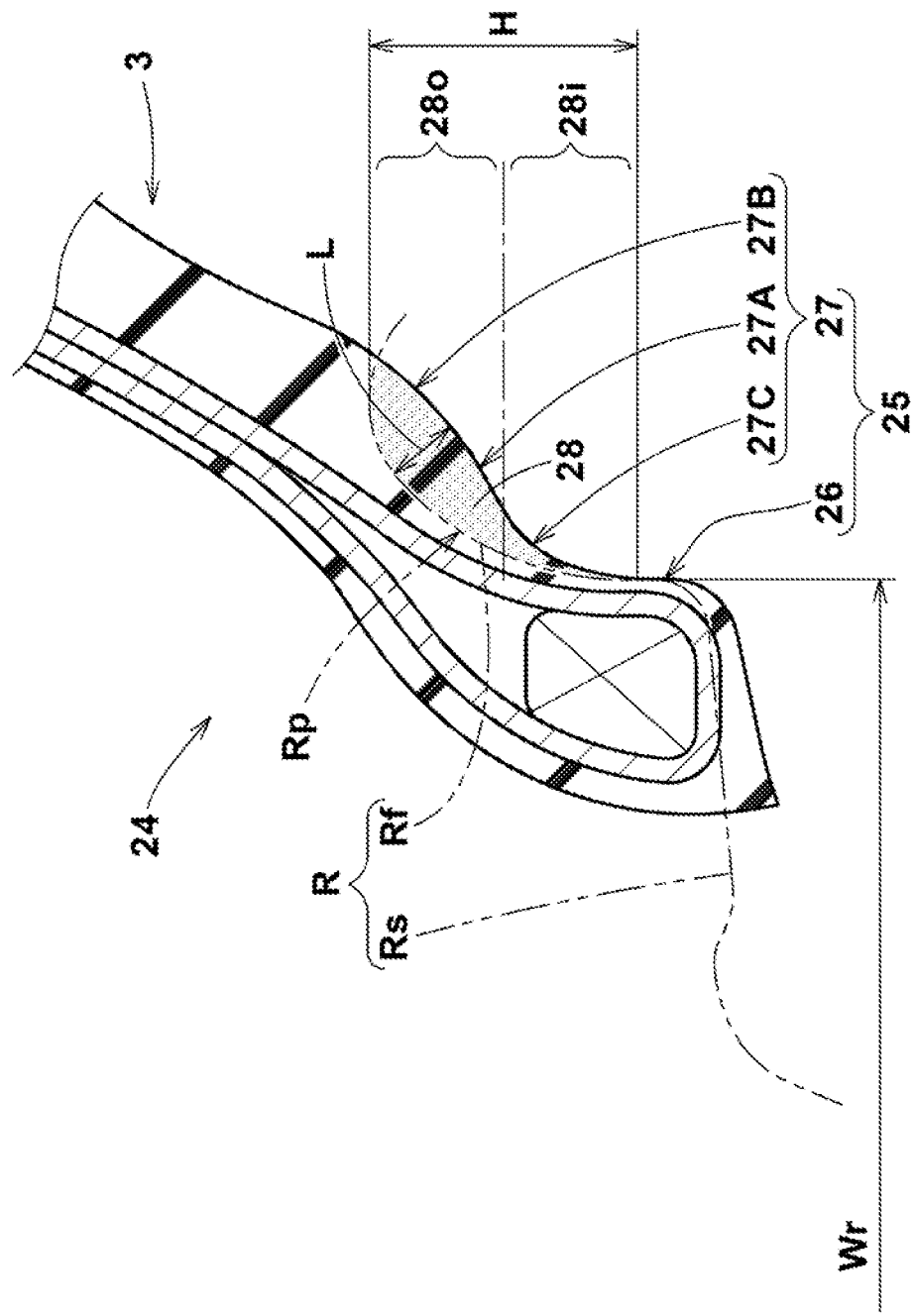
FIG. 4 is an enlarged cross-sectional view of the bead portion of still another embodiment of the present invention.

FIG. 4 shows one of the bead portions 24 of a third embodiment of the present invention.

FIG. 4 also shows the profile of the standard wheel rim (R) by alternate long and two short dashes line under the conditions as described with respect to FIG. 2.

As shown in FIG. 4, the axially outer surface of each of the bead portions 24 is provided with a profile 25. The profile 25 comprises a radially inner portion 26 located axially outward of the bead core 5, and a radially outer portion 27 located radially outward of the radially inner portion 26.

Similarly to the radially inner portion 10 in the first embodiment described above, the radially inner portion 26 in the third embodiment extends substantially linearly in the tire radial direction and substantially along the rim flange Rf.

Similarly to the radially outer portion 11 in the first embodiment described above, the radially outer portion 27 is connected to the radially outer edge of the radially inner portion 26 smoothly, namely, without an inflection point. Preferably, the radially outer portion 27 is extended radially outwardly to the sidewall portion 3, while inclining toward the axially outside.

In the third embodiment, the radially outer portion 27 comprises a radially outer arcuate part 27B, a radially inner arcuate part 27C and a linear part 27A therebetween.

The linear part 27A extends substantially linear between the arcuate parts 27B and 27C.

The radially outer arcuate part 27B extends radially outwardly from the linear part 27A to the side wall portion 3, while curving convexly toward the outside in an arc shape, without forming an inflection point at their junctions.

The radially inner arcuate part 27C extends radially inwardly from the linear part 27A to the radially inner portion 26, while curving convexly toward the inside in an arc shape, without forming an inflection point at their junctions.

It is preferable that each of the arcuate parts 27B and 27C has a single radius of curvature.

Similarly to the first embodiment, at least a part of the radially outer portion 27 of the profile 25 protrudes axially outwardly from the profile Rp of the inner surface of the rim flange Rf of the standard wheel rim (R), therefore, there is formed an overlap region 28 surrounded by the radially outer portion 27 of the bead profile 25 and the rim profile Rp. Preferably, the area and radially height H of the overlap region 28 are set in the same ranges as those for the overlap region 12 in the above-described first embodiment.

The overlapping amount L of the overlap region 28, which is a distance measured from the profile Rp of the rim flange Rf to the profile 25 of the bead portion normally to the rim profile Rp, has a maximum, and it is preferable that the maximum occurs in a radially outer portion 28o.

Preferably, the maximum is in a range from 0.5 to 3.0 mm. Here, the radially outer portion 28o is a radially outer half of the overlap region 28 when halved in the tire radial direction at the intermediate position of the radial height H.

In FIG. 4, "28i" denotes the radially inner portion.

The bead portion 24 having such overlap region 28 can achieve both the ride comfort and handling stability of the tire 1 similarly to the bead portion 4 of the first embodiment described above.

While detailed description has been made of preferable embodiments of the present invention, the present invention can be embodied in various forms without being limited to the illustrated embodiment.

Comparison Tests

Based on the internal structure shown in FIG. 1, motorcycle tires of size 200/55R17 were experimentally manufactured as test tires. The specifications are shown in Table 1. Each test tire was mounted on the rear wheel of a test vehicle (1000 cc motorbike) and tested for the handling stability and ride comfort as follows. (tire pressure 200 kPa)

<Handling Stability Test>

The test vehicle was run in a circuit course, and the test rider evaluated the handling stability. The results are indicated in Table 1 by an index based on Ref. 1 being 100, wherein the larger value is better.

<Ride Comfort Test>

The test vehicle was run in public roads, and the test rider evaluated the ride comfort. The results are indicated in Table 1 by an index based on Ref. 1 being 100, wherein the larger value is better.

TABLE 1

| Tire | Ref. 1 | Ex. 1 | Ex. 2 | Ex. 3 | Ex. 4 | Ex. 5 | Ex. 6 |
|---|---|---|---|---|---|---|---|
| maximum of overlapping amount L (mm) | 0 | 0.3 | 1 | 1.5 | 2 | 2.5 | 3 |
| area of overlap region (sq. mm) | 0 | 2.5 | 4 | 10 | 12 | 18 | 25 |
| handling stablity | 100 | 105 | 110 | 120 | 120 | 120 | 110 |
| ride comfort | 100 | 105 | 120 | 110 | 115 | 105 | 100 |

From the test results, it was confirmed that the embodiments were improved in both the handling stability and ride comfort as compared with the comparative example.

DESCRIPTION OF THE REFERENCE SIGNS 3 sidewall portion
5 bead core
4, 14, 24 bead portion
9, 15, 25 bead profile
10, 16, 26 radially inner portion of bead profile
11, 17, 26 radially outer portion of bead profile
R standard rim
Rf Rim flange

The invention claimed is:

1. A motorcycle tire which is used by being mounted on a standard rim comprising a pair of bead seats and a pair of rim flanges, which comprises: a tread portion, a pair of sidewall portions, a pair of bead portions each with a bead core therein, and a carcass comprising a carcass ply having both edge portions turned up around the respective bead cores,
   wherein
      an axially outer surface of each of the bead portions has a profile which comprises
         a radially inner portion located axially outward of the bead core and extending substantially linearly in the tire radial direction, and
         a radially outer portion smoothly continued from the radially inner portion and extending radially outwardly, while inclining toward the axially outside, so as to connect to a profile of an axially outer surface of the sidewall portion, and
   wherein
      an axial width between the radially inner portions of said profiles of the respective bead portions coincides with a rim width between the rim flanges,
      an axial center of said axial width between the bead portions coincides with an axial center of said rim width between the rim flanges,
      the rotational axis of the tire coincides with the rotational axis of the wheel rim,
      at least a part of said radially outer portion of each profile protrudes axially outwardly from a profile of the axially inner surface of each rim flange so as to form an overlap region defined as being surrounded by the profile of the bead portion and the profile of the rim flange,
      the overlap region extends radially inwardly to have a radially inner end positioned radially inside a radially outer end of the bead core, and
      the tread portion is curved and has a pair of tread edges such that the tire maximum cross-sectional width is between the tread edges.

2. The motorcycle tire according to claim 1, wherein in the meridian cross-section of the tire, an overlapping amount of the overlap region defined by a distance measured from the profile of the rim flange to the profile of the bead portion normally to the rim profile, has a maximum which occurs in a radially outer half of the overlap region when halved in the tire radial direction at the intermediate position of the radial height of the overlap region.

3. The motorcycle tire according to claim 2, wherein the maximum of said overlapping amount is from 0.5 is 3.0 mm.

4. The motorcycle tire according to claim 1, wherein in the meridian cross-section of the tire, the area of said overlap region is from 3.5 to 2.0 sq·mm.

5. The motorcycle tire according to claim 1, wherein said radially outer portion comprises a linear part extending substantially linearly in the meridian cross-section of the tire.

6. The motorcycle tire according to claim 1, wherein said radially outer portion comprises arcuate parts each extending in an arc shape in the meridian cross-section of the tire.

7. The motorcycle tire according to claim 1, wherein said radially inner end of the overlap region is positioned radially inside a center of a cross section of the bead core.

8. A motorcycle tire which is used by being mounted on a standard rim comprising a pair of bead seats and a pair of rim flanges, which comprises: a tread portion having a pair of tread edges, a pair of sidewall portions, a pair of bead portions each with a bead core therein, and a carcass comprising a carcass ply having both edge portions turned up around the respective bead cores,
   wherein
      an axially outer surface of each of the bead portions has a profile which comprises
         a radially inner portion located axially outward of the bead core and extending substantially linearly in the tire radial direction, and
         a radially outer portion smoothly continued from the radially inner portion and extending radially outwardly, while inclining toward the axially outside, so as to connect to a profile of an axially outer surface of the sidewall portion, and
   wherein
      an axial width between the radially inner portions of said profiles of the respective bead portions coincides with a rim width between the rim flanges, an axial center of said axial width between the bead portions coincides with an axial center of said rim width between the rim flanges, the rotational axis of the tire coincides with the rotational axis of the wheel rim, at least a part of said radially outer portion of each profile protrudes axially outwardly from a profile of the axially inner surface of each rim flange so as to form an overlap region defined as being surrounded by the profile of the bead portion and the profile of the rim flange, and the tread portion is curved so that the tire maximum cross-sectional width is between the tread edges.

9. The motorcycle tire according to claim 8, wherein said overlap region extends radially inwardly to have a radially inner end positioned radially inside a center of a cross section of the bead core.

10. The motorcycle tire according to claim 8, wherein said overlap region extends radially inwardly to have a radially inner end positioned radially inside a radially outer end of the bead core.

\* \* \* \* \*